(12) United States Patent
Suzuki et al.

(10) Patent No.: US 12,040,445 B2
(45) Date of Patent: Jul. 16, 2024

(54) SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE-CONTAINING SHEET AND ALL-SOLID STATE SECONDARY BATTERY

(71) Applicant: FUJIFILM Corporation, Tokyo (JP)

(72) Inventors: Hideyuki Suzuki, Kanagawa (JP); Shin Ozawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1041 days.

(21) Appl. No.: 16/865,408

(22) Filed: May 3, 2020

(65) Prior Publication Data

US 2020/0266486 A1 Aug. 20, 2020

Related U.S. Application Data

(63) Continuation of application No. PCT/JP2018/042351, filed on Nov. 15, 2018.

(30) Foreign Application Priority Data

Nov. 16, 2017 (JP) .................................. 2017-220874

(51) Int. Cl.
*H01M 10/0562* (2010.01)
*H01M 4/02* (2006.01)
*H01M 10/0525* (2010.01)

(52) U.S. Cl.
CPC ... *H01M 10/0562* (2013.01); *H01M 10/0525* (2013.01); *H01M 2004/027* (2013.01);
(Continued)

(58) Field of Classification Search
None
See application file for complete search history.

(56) References Cited

U.S. PATENT DOCUMENTS

| 9,236,158 B2 | 1/2016 | Kubo et al. |
| 2014/0004257 A1 | 1/2014 | Kubo et al. |

(Continued)

FOREIGN PATENT DOCUMENTS

| CN | 103430364 | 12/2013 |
| JP | H03115856 | 5/1991 |

(Continued)

OTHER PUBLICATIONS

English language machine translation of Tamura et al. (JP 2010-040218 A). (Year: 2023).*

(Continued)

*Primary Examiner* — Eli S Mekhlin
(74) *Attorney, Agent, or Firm* — JCIPRNET

(57) ABSTRACT

Provided are a solid electrolyte composition including a sulfide-based inorganic solid electrolyte and a plurality of kinds of alkane dispersion media, in which the plurality of kinds of alkane dispersion media include, with respect to a peak of each alkane dispersion medium obtained by measurement under specific conditions using a gas chromatography, two kinds of alkane dispersion media in which a difference in retention time between mutually adjacent peaks of dispersion media is more than 0 minutes and within 0.2 minutes, a solid electrolyte-containing sheet, an all-solid state secondary battery, and methods for manufacturing a solid electrolyte-containing sheet and an all-solid state secondary battery.

7 Claims, 1 Drawing Sheet

(52) U.S. Cl.
CPC ............... *H01M 2004/028* (2013.01); *H01M 2300/0068* (2013.01)

(56) References Cited

U.S. PATENT DOCUMENTS

2016/0329554 A1  11/2016  Inoue et al.
2019/0372160 A1* 12/2019  Makino ............... H01M 10/056

FOREIGN PATENT DOCUMENTS

| JP | H07103960   | 4/1995  |
| JP | H10212166   | 8/1998  |
| JP | 2010040218  | 2/2010  |
| JP | 2012212652  | 11/2012 |
| JP | 2013125697  | 6/2013  |
| JP | 2016213069  | 12/2016 |
| WO | 2018051432  | 3/2018  |

OTHER PUBLICATIONS

Office Action of Japan Counterpart Application, with English translation thereof, issued on Aug. 24, 2021, pp. 1-7.
Junya Hoshi et al., "Survey of Component Composition of Petroleum-Based Mixed Solvent", Annual Report of Tokyo Institute of Environmental Sciences, 2007, with English abstract, pp. 1-11.
"International Search Report (Form PCT/ISA/210)" of PCT/JP2018/042351, mailed on Feb. 19, 2019, with English translation thereof, pp. 1-5.
"International Preliminary Report on Patentability (Form PCT/IPEA/409) of PCT/JP2018/042351", dated on Feb. 14, 2020, with English translation thereof, pp. 1-12.
Office Action of Japan Counterpart Application, with English translation thereof, issued on May 24, 2022, pp. 1-10.
"Office Action of Korea Counterpart Application", issued on Nov. 4, 2021, with English translation thereof, p. 1-p. 9.
Office Action of Japan Counterpart Application, with English translation thereof, issued on Apr. 27, 2021, pp. 1-6.
Hui-Fengxue, et al., "Simultaneous determination of major characteristic parameters of naphtha by capillary gas chromatography", Fuel Processing Technology vol. 87, Issue 4, Apr. 1, 2006, pp. 303-308.
"Search Report of Europe Counterpart Application", issued on Oct. 22, 2020, p. 1-p. 7.
"Office Action of Japan Counterpart Application" with English translation thereof, issued on Nov. 1, 2021, p. 1-p. 9.
Lee Meng Yao, "Tutuatorial of Organic Analysis" with English concise explanation, Shaanxi Science and Technology Press, Jul. 2005, pp. 1-13.
"Office Action of China Counterpart Application" with English translation thereof, issued on Oct. 28, 2022, p. 1-p. 19.
Office Action of Japan Counterpart Application, with English translation thereof, issued on Sep. 5, 2023, pp. 1-6.

* cited by examiner

SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE-CONTAINING SHEET AND ALL-SOLID STATE SECONDARY BATTERY

CROSS-REFERENCE TO RELATED APPLICATIONS

This application is a Continuation of PCT International Application No. PCT/JP2018/042351 filed on Nov. 15, 2018, which claims priority under 35 U.S.C. § 119 (a) to Japanese Patent Application No. 2017-220874 filed in Japan on Nov. 16, 2017. Each of the above applications is hereby expressly incorporated by reference, in its entirety, into the present application.

BACKGROUND OF THE INVENTION

1. Field of the Invention

The present invention relates to a solid electrolyte composition, a solid electrolyte-containing sheet, an all-solid state secondary battery, and methods for manufacturing a solid electrolyte-containing sheet and an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

Under such circumstances, all-solid state secondary batteries in which a sulfide-based inorganic solid electrolyte is used instead of the organic electrolytic solution are attracting attention. In all-solid state secondary batteries, since all of the negative electrode, the electrolyte, and the positive electrode are solid, safety and reliability that are considered as a problem of batteries in which the organic electrolytic solution is used can be significantly improved.

Due to the advantages described above, research and development of an all-solid state secondary battery as a next-generation lithium ion battery is being progressed, and a material forming a constituent layer of the all-solid state secondary battery is also being studied. For example, a research of a composition (slurry) forming a solid electrolyte layer of an all-solid state secondary battery can be mentioned. JP2012-212652A describes a slurry containing a sulfide-based inorganic solid electrolyte and at least one polar solvent having low reactivity with the sulfide-based inorganic solid electrolyte.

SUMMARY OF THE INVENTION

For practical use of all-solid state secondary batteries, it is desired to further improve battery performance such as discharging capacity. In order to further improve the battery performance such as discharging capacity, solid particles are needed to be uniformly dispersed in a solid electrolyte layer and/or an electrode active material layer constituting the all-solid state secondary battery so that the characteristics do not vary throughout the layer. Further, it is desired to manufacture an all-solid state secondary battery having a desired level of battery performance with good reproducibility. However, in the solid electrolyte layer and the electrode active material layer formed by using the slurry described in JP2012-212652A, solid particles are present non-uniformly and reproducibility of layer formation is low.

In consideration of the above circumstances, an object of the present invention is to provide a solid electrolyte composition used as a material for forming a solid electrolyte layer or an electrode active material layer of an all-solid state secondary battery, which can suppress irregular and non-uniform aggregation of solid particles during drying in the layer forming step, has excellent uniform dispersibility of solid particles (for example, sulfide-based inorganic solid electrolyte), and can form the solid electrolyte layer or the electrode active material layer with high reproducibility. In addition, another object of the present invention is to provide a solid electrolyte-containing sheet and an all-solid state secondary battery using the solid electrolyte composition. Furthermore, still another object of the present invention is to provide methods for manufacturing the solid electrolyte-containing sheet and the all-solid state secondary battery.

As a result of studies performed extensively, the present inventors have found that, by using a solid electrolyte composition containing a plurality of kinds of alkane dispersion media including two kinds of alkane dispersion media in which the difference in retention time between the mutually adjacent peaks of the dispersion media, which is measured by gas chromatography, is equal to or less than a specific value and containing a sulfide-based inorganic solid electrolyte, as a material forming a solid electrolyte layer or an electrode active material layer, the uniform dispersibility of solid particles of the solid electrolyte layer or the electrode active material layer that are formed due to evaporation or volatilization of the alkane dispersion media in a state that may be said to be continuous can be effectively improved, and the solid electrolyte layer or the electrode active material layer can be formed with high reproducibility. The present invention has been completed by further repeating studies on the basis of the above-described findings.

That is, the above-described problems have been solved by the following means.

<1> A solid electrolyte composition comprising a sulfide-based inorganic solid electrolyte and a plurality of kinds of alkane dispersion media, in which the plurality of kinds of alkane dispersion media includes, with respect to a peak of each alkane dispersion medium obtained by measurement under the following conditions using a gas chromatography, two kinds of alkane dispersion media in which a difference in retention time between mutually adjacent peaks of dispersion media is more than 0 minutes and within 0.2 minutes.

<Conditions for Gas Chromatography>

Column: Agilent J&W GC COLUMN manufactured by Agilent Technologies Inc., 30 m, 0.25 mmφ, 40° C.

Injection amount: 1 μL of a solution obtained by dissolving 25 mg of a plurality of kinds of alkane dispersion media in 25 ml of ethyl acetate Mobile phase: He Temperature rising: After held at 40° C. for 2 minutes, the temperature is raised to 300° C. at a rate of 10° C./minute and held at 300° C. for 5 minutes.

A sample is injected in split mode at a split ratio of 20:1.

A measurement time is 50 minutes from a sample injection.

<2> The solid electrolyte composition according to <1>, in which the plurality of alkane dispersion media include a cyclic alkane dispersion medium.

<3> The solid electrolyte composition according to <1> or <2>, comprising at least one of an ether dispersion medium, an ester dispersion medium, a ketone dispersion medium, a carbonate dispersion medium, a nitrile dispersion medium, or an amide dispersion medium.

<4> The solid electrolyte composition according to any one of <1> to <3>, further comprising an active material.

<5> A solid electrolyte-containing sheet comprising a solid electrolyte-containing sheet having a layer formed of the solid electrolyte composition according to any one of <1> to <4>, in which the layer contains the alkane dispersion medium in an amount of 1,000 ppm or less by mass.

<6> An all-solid state secondary battery comprising a positive electrode active material layer, a negative electrode active material layer, and a solid electrolyte layer, in which at least one layer of the positive electrode active material layer, the negative electrode active material layer, or the solid electrolyte layer is a layer formed of the solid electrolyte composition according to any one of <1> to <4>.

<7> A method for manufacturing the solid electrolyte-containing sheet according to <5>, the method comprising a step of applying the solid electrolyte composition according to any one of <1> to <4> onto a base material.

<8> A method for manufacturing an all-solid state secondary battery, the method comprising a step of obtaining a solid electrolyte-containing sheet by the manufacturing method according to <7>.

The solid electrolyte composition of the embodiment of the present invention makes it possible to form a solid electrolyte layer or an electrode active material layer having excellent uniform dispersibility of solid particles with high reproducibility. Further, the solid electrolyte-containing sheet and the all-solid state secondary battery of the embodiment of the present invention have excellent uniform dispersibility of solid particles constituting a layer and a high discharging capacity, and can suppress variations thereof. Further, according to manufacturing methods for the solid electrolyte-containing sheet and the all-solid state secondary battery of the embodiment of the present invention, it is possible to provide an all-solid state secondary battery having excellent uniform dispersibility of solid particles constituting a layer and a high discharge capacity and suppressing variations thereof.

DESCRIPTION OF THE PREFERRED EMBODIMENTS

Figure 1:
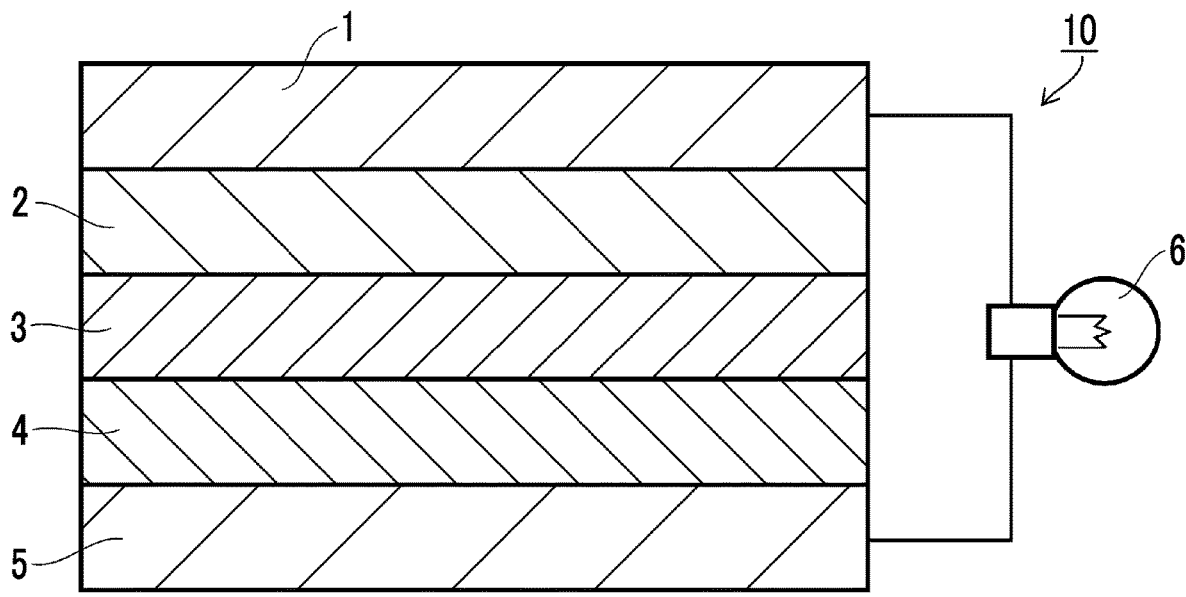
FIG. 1 is a vertical cross-sectional view schematically illustrating an all-solid state secondary battery according to a preferred embodiment of the present invention.
Figure 2:
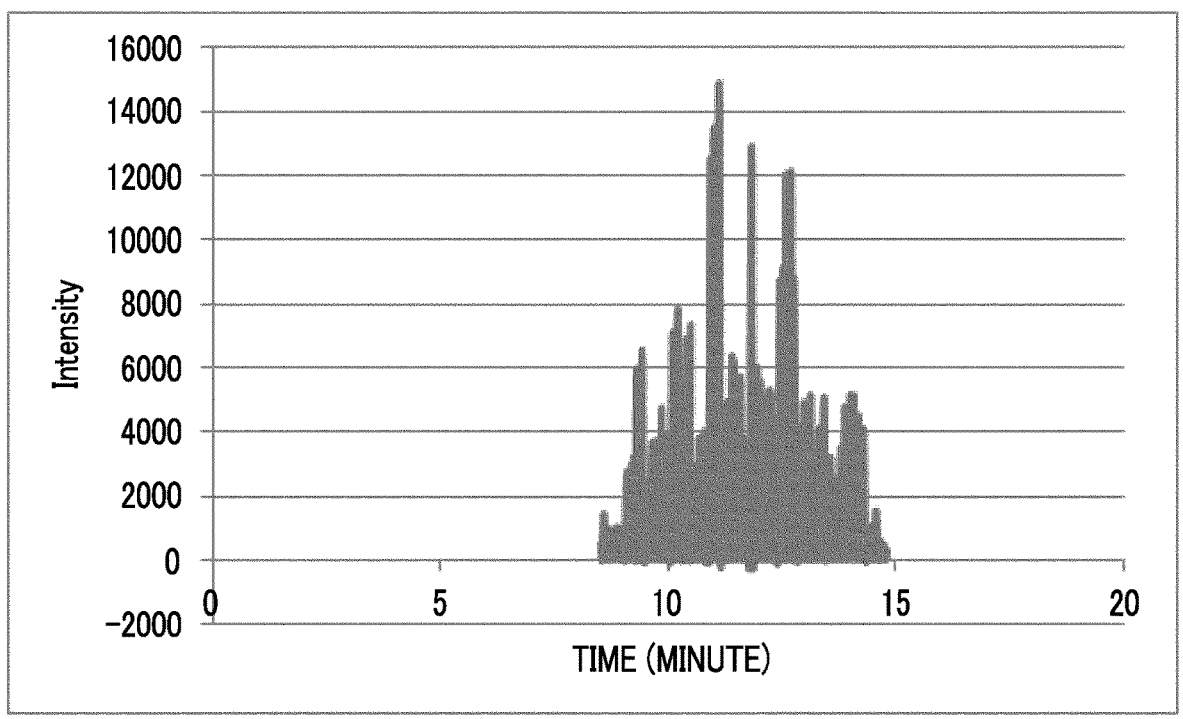
FIG. 2 is a chromatogram obtained by a gas chromatography measurement of an alkane dispersion medium (MC-3000S SOLVENT) used in Examples.

In the description of the present invention, numerical ranges expressed using "to" include numerical values before and after the "to" as the lower limit value and the upper limit value.

[Solid Electrolyte Composition]

A solid electrolyte composition of the embodiment of the present invention includes a sulfide-based inorganic solid electrolyte and a plurality of kinds of alkane dispersion media, in which the plurality of kinds of alkane dispersion media includes, with respect to a peak of each alkane dispersion medium in the plurality of kinds of alkane dispersion media obtained by measurement under the following conditions using a gas chromatography, two kinds of alkane dispersion media in which a difference in retention time between mutually adjacent peaks is within 0.2 minutes.

<Conditions for Gas Chromatography>

Model used: For example, GC-2010 (manufactured by Shimadzu Corporation)

Column: Agilent J&W GC COLUMN (manufactured by Agilent Technologies Inc.), 30 m, 0.25 mmφ, 40° C.

Injection amount: 1 μL of a solution obtained by dissolving 25 mg of a plurality of kinds of alkane dispersion media in 25 ml of ethyl acetate Mobile phase (carrier gas): He Temperature rising: After held at 40° C. for 2 minutes, the temperature is raised to 300° C. at a rate of 10° C./minute and held at 300° C. for 5 minutes.

A sample is injected in split mode at a split ratio of 20:1.

A measurement time is 50 minutes from a sample injection.

Detector: For example, hydrogen flame ionization detector (FID)

In a case where the solid electrolyte composition of the embodiment of the present invention contains a sulfide-based inorganic solid electrolyte and the plurality of kinds of alkane dispersion media, solid particles can be present in a uniformly dispersed state at a high level in a solid electrolyte layer or an electrode active material layer formed using the solid electrolyte composition. Further, such a solid electrolyte layer or an electrode active material layer can be produced with the solid electrolyte composition of the embodiment of the present invention with good reproducibility. Although not clear, the details of the reason can be considered as follows.

One possible reason is considered to be that, by containing a plurality of kinds of specific alkane dispersion media when forming a layer, local aggregation of the sulfide-based inorganic solid electrolyte or formation of pores during drying is suppressed due to substantially continuous evaporation or volatilization of the alkane dispersion media from the slurry, and the uniformity of the layer is improved in the solid electrolyte composition (slurry) of the embodiment of the present invention.

Hereinafter, components that the solid electrolyte composition of the embodiment of the present invention contains and components that the solid electrolyte composition is capable of containing will be described.

(Sulfide-Based Inorganic Solid Electrolytes)

The solid electrolyte composition of the embodiment of the present invention contains the sulfide-based inorganic solid electrolyte.

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (polymer electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion-conductive material. In addition, the inorganic solid electrolyte is a solid in a static state and thus, generally, is not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has conductivity of ions of a metal belonging to Group I or II of the periodic table and is generally a substance not having electron conductivity.

As the inorganic solid electrolyte, it is possible to appropriately select and use solid electrolyte materials that are applied to this kind of product. Typical examples of the inorganic solid electrolyte include (i) sulfide-based inorganic solid electrolytes and (ii) oxide-based inorganic solid electrolytes. In the present invention, sulfide-based inorganic solid electrolytes are used.

Sulfide-based inorganic solid electrolytes used in the present invention are preferably electrolytes which contain sulfur atoms (S), have ion conductivity of a metal belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive sulfide-based inorganic solid electrolytes satisfying a composition represented by Formula (I).

   Formula (I)

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the individual elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the blending amount of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S$:$P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the individual raw materials do not matter. Examples of a method for synthesizing sulfide-based inorganic solid electrolyte materials using the above-described raw material compositions include an amorphorization method. Examples of the amorphorization methods include a mechanical milling method, a solution method, and a melting quenching method. This is because treatments at a normal temperature (25° C.) become possible, and it is possible to simplify manufacturing steps.

The volume-average particle diameter of the sulfide-based inorganic solid electrolyte is not particularly limited but is preferably 0.01 μm or more and more preferably 0.1 μm or more. The upper limit is preferably 100 μm or less and more preferably 50 μm or less. The average particle diameter of the sulfide-based inorganic solid electrolyte particles is measured in the following order. The sulfide-based inorganic solid electrolyte particles are diluted by using water (heptane in a case where the inorganic solid electrolyte is unstable in water) in a 20 ml sample bottle to obtain 1% by mass of a dispersion liquid. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis—Dynamic light scattering method" is referred to as necessary. Five specimens are prepared and measured per level, and the average values thereof are employed.

In a case where a decrease in the interface resistance and the maintenance of the decreased interface resistance in the case of being used in the all-solid state secondary battery are taken into account, the content of the sulfide-based inorganic solid electrolyte in the solid component of the solid electrolyte composition is preferably 5% by mass or more, more preferably 10% by mass or more, and particularly preferably 15% by mass or more with respect to 100% by mass of the solid components. From the same viewpoint, the upper limit is preferably 99.9% by mass or less, more preferably 99.5% by mass or less, and particularly preferably 99% by mass or less.

These sulfide-based inorganic solid electrolytes may be used singly or two or more inorganic solid electrolytes may be used in combination.

However, in a case where the solid electrolyte composition contains an active material described below, regarding the content of the sulfide-based inorganic solid electrolyte in the solid electrolyte composition, the total content of the active material and the inorganic solid electrolyte is preferably in the above-described range.

Meanwhile, the solid content (solid component) in the present specification refers to a component that does not volatilize or evaporate and thus disappear in the case of being subjected to a drying treatment in a nitrogen atmosphere at 170° C. for six hours. Typically, the solid content refers to a component other than a dispersion medium described below.

(Oxide-Based Inorganic Solid Electrolytes)

The solid electrolyte composition of the embodiment of the present invention may contain an oxide-based inorganic solid electrolyte in addition to the sulfide-based inorganic solid electrolyte within a range that does not impair the effects of the present invention. Oxide-based inorganic solid electrolytes are preferably compounds which contain oxygen atoms (O), have an ion conductivity of a metal belonging to Group I or II of the periodic table, and have electron-insulating properties.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}{}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}{}_{xe}D^{ee}O$ (xe represents a number of 0 or more and 0.1 or less, and $M^{cc}$ represents a divalent metal atom. $D^{cc}$ represents a halogen atom or a combination of two or more halogen atoms.), $Li_xSi_yO_{zf}$ (1≤xf≤5, 0≤yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super-ionic conductor (LISICON)-type crystal structure, $La_{0.55}Li_{0.35}TiO_3$ having a perovskite-type crystal structure, $LiTi_2P_3O_{12}$ having a natrium super-ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0<yh≤1), and $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$), LiPON in which some of oxygen atoms in lithium phosphate are substituted with nitrogen, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like), and the like. It is also possible to preferably use $LiA^1ON$ ($A^1$ represents at least one element selected from Si, B, Ge, Al, C, Ga, or the like) and the like.

The description of volume-average particle diameter and the measurement method of the sulfide-based inorganic solid electrolyte can be preferably applied to the volume-average particle diameter and the measurement method of the oxide inorganic solid electrolyte.

(Alkane Dispersion Medium)

As described above, the plurality of kinds of alkane dispersion media used in the solid electrolyte composition of the embodiment of the present invention include two kinds of alkane dispersion media in which a difference (hereinafter, also simply referred to as "difference in retention time between the mutually adjacent peaks") in retention time between the mutually adjacent peaks, which is obtained by measuring under the above conditions using a gas chromatography, is more than 0 minutes and less than 0.2 minutes.

The alkane dispersion medium used in the solid electrolyte composition of the embodiment of the present invention may be a chain alkane or a cyclic alkane, and preferably has 6 to 12 carbon atoms. Specific examples of the alkane dispersion media are not particularly limited but include heptane, octane, nonane, decane, undecane, dodecane, cyclohexane, cyclooctane, cyclononane, cyclodecane, methylcyclohexane, ethylcyclohexane, methylpentane, methylheptane, methyl octane, methylnonane, dimethylpentane, and methylethylpentane. The plurality of alkane dispersion media used in the solid electrolyte composition of the embodiment of the present invention are used in combination with these alkane dispersion media.

The number of kinds of the alkane dispersion medium used in the solid electrolyte composition of the embodiment of the present invention is not particularly limited as long as it is 2 or more, but is preferably 2 or more, more preferably 5 or more, and particularly preferably 10 to 30. The components contained in the alkane dispersion medium can be isolated and purified by a conventional method such as distillation or column chromatography. The structure of each isolated component can be specified by using, for example, NMR.

Regarding the plurality of kinds of alkane dispersion media, the number of combinations of the alkane dispersion media in which the difference in retention time between the mutually adjacent peaks is within 0.2 minutes is preferably 2 or more, more preferably 4 or more, also preferably 6 or more, also preferably 8 or more, also preferably 10 or more, and also preferably 12 or more. The upper limit of the number of the above combinations is not particularly limited. For example, the number of the combinations can be set to 50 or lower, or can be set to 40 or lower.

The number of kinds of the alkane solvents used in the present invention is 2 or more, preferably 4 or more, more preferably 6 or more, still more preferably 8 or more, and even still more preferably 10 or more. The upper limit of the number of kinds of the alkane solvents used in the present invention is not particularly limited. For example, the number can be 50 or lower, and may be 40 or lower.

Regarding the plurality of alkane dispersion media, the number of combinations of the alkane dispersion media in which the difference in retention time between the mutually adjacent peaks is within 0.2 minutes or more is preferably as many as possible. Among the plurality of alkane dispersion media, two or more alkane dispersion media in which the difference in retention time between the mutually adjacent peaks is within 0.2 minutes are preferable, five or more alkane dispersion media in which the difference in retention time between the mutually adjacent peaks is within 0.2 minutes are more preferable, and ten or more alkane dispersion media in which the difference in retention time between the mutually adjacent peaks is within 0.2 minutes are particularly preferable. For example, in a case where ten kinds of alkane dispersion media are used in combination, the difference in retention time between the mutually adjacent peaks of eight or more alkane dispersion media is preferably within 0.2 minutes.

In the solid electrolyte composition of the embodiment of the present invention, the retention times of all peaks obtained by measurement using gas chromatography under the above-described conditions are 0 to 30 minutes from the sample injection, preferably 1 to 20 minutes, and particularly preferably 4 to 17 minutes.

The content proportion of each alkane dispersion medium contained in the plurality of alkane dispersion media included in the solid electrolyte composition of the embodiment of the present invention is appropriately set so that solid particles are uniformly dispersed in the solid electrolyte layer or the electrode active material layer. The proportion of the alkane dispersion medium having the largest content in the plurality of alkane dispersion media is preferably 90% by mass or less, and more preferably 70% by mass or less. On the other hand, the proportion of the alkane dispersion medium having the smallest content in the plurality of alkane dispersion media is preferably 0.1% by mass or more, and more preferably 0.5% by mass or more.

The content proportion can be calculated from the peak surface area of the chromatogram.

The plurality of alkane dispersion media used in the present invention preferably include a cyclic alkane because the viscosity of a dispersion medium can be increased and the stability of the solid electrolyte composition slurry can be improved.

(Polar Dispersion Medium)

The solid electrolyte composition of the embodiment of the present invention preferably includes a polar dispersion medium (at least one of an ether dispersion medium, an ester dispersion medium, a ketone dispersion medium, a carbonate dispersion medium, a nitrile dispersion medium, or an amide dispersion medium) in order to further improve the discharging capacity of a battery.

Examples of the ether dispersion media include alkylene glycols (triethylene glycol and the like), alkylene glycol monoalkyl ethers (ethylene glycol monomethyl ether and the like), alkylene glycol dialkyl ethers (ethylene glycol dimethyl ether and the like), dialkyl ethers (diisopropyl ether, dibutyl ether, and the like), and cyclic ethers (tetrahydrofuran, dioxanes (including each of 1,2-, 1,3-, and 1,4-isomers, and the like)).

Examples of the ester dispersion media include ethyl acetate, butyl acetate, propyl acetate, butyl butyrate, and butyl pentanoate.

Examples of the ketone dispersion media include acetone, methyl ethyl ketone, methyl isobutyl ketone, cyclohexanone, dipropyl ketone, diisopropyl ketone, dibutyl ketone, diisobutyl ketone, and dipentyl ketone.

Examples of the carbonate dispersion media include dimethyl carbonate, diethyl carbonate, ethylene carbonate, and propylene carbonate.

Examples of the nitrile dispersion media include acetonitrile, propionitrile, and isobutyronitrile.

Examples of the amide dispersion media include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric triamide.

The mass ratio of the plurality of alkane dispersion media to the polar solvent is preferably 10/90 to 99/1, more preferably 30/70 to 97/3, and particularly preferably 50/50 to 95/5.

The solid electrolyte composition of the embodiment of the present invention may contain the above-described polar dispersion medium singly or in combination of two or more.

(Active Material)

The solid electrolyte composition of the embodiment of the present invention may also contain an active material capable of intercalating and deintercalating ions of a metal element belonging to Group I or II of the periodic table. Hereinafter, the "active material capable of intercalating and deintercalating ions of a metal belonging to Group I or II of the periodic table" will also be simply referred to as the "active material".

As the active material, a positive electrode active material and a negative electrode active material are exemplified, and a metal oxide (preferably a transition metal oxide) that is a positive electrode active material, a metal oxide that is a negative electrode active material, or a metal capable of forming an alloy with lithium such as Sn, Si, Al, or In is preferable.

In the present invention, the solid electrolyte composition containing the active material (a positive electrode active material or a negative electrode active material) will be referred to as a composition for an electrode (a composition for a positive electrode or a composition for a negative electrode).

—Positive Electrode Active Material—

A positive electrode active material that the solid electrolyte composition of the embodiment of the present invention may contain is preferably a positive electrode active material capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of $Li/M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic NASICON-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, and cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a bedded salt-type structure (MA) is preferable, and LCO or NMC is more preferable.

The shape of the positive electrode active material is not particularly limited but is preferably a particle shape. The volume-average particle diameter (circle-equivalent average particle diameter) of positive electrode active material particles is not particularly limited. For example, the volume-average particle diameter can be set to 0.1 to 50 μm. In order to provide a predetermined particle diameter to the positive electrode active material, an ordinary crusher or classifier may be used. A positive electrode active material obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly, or two or more positive electrode active materials may be used in combination.

In case of forming a positive electrode active material layer, the mass (mg) of the positive electrode active material per unit area ($cm^2$) in the positive electrode active material layer (weight per unit area) is not particularly limited. The weight per unit area can be appropriately determined depending on a set battery capacity.

The content of the positive electrode active material in the solid electrolyte composition is not particularly limited but is preferably 10% to 95% by mass, more preferably 30% to 90% by mass, still more preferably 50% to 85% by mass, and particularly preferably 55% to 80% by mass with respect to a solid content of 100% by mass.

—Negative Electrode Active Material—

A positive electrode active material that the solid electrolyte composition of the embodiment of the present invention may contain is preferably a negative electrode active material capable of reversibly intercalating and deintercalating lithium ions. The above-described material is not particularly limited as long as the material has the above-described characteristics, and examples thereof include a carbonaceous material, a metal oxide such as tin oxide, silicon oxide, a metal complex oxide, a lithium single body, a lithium alloy such as a lithium aluminum alloy, metals capable of forming alloys with lithium such as Sn, Si, Al, and In. Among these, carbonaceous materials or a lithium single body is preferable. In addition, the metal complex oxide is preferably capable of intercalating and deintercalating lithium. The materials are not particularly limited but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines.

In a compound group constituted of the amorphous oxides and the chalcogenides, amorphous oxides of semimetal elements and chalcogenides are more preferable, and elements belonging to Groups XIII (IIIB) to XV (VB) of the periodic table, oxides constituted of one element or a combination of two or more elements of Al, Ga, Si, Sn, Ge, Pb, Sb, and Bi, and chalcogenides are particularly preferable. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferable since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit mass increases. Therefore, it is possible to increase the battery capacity. As a result, there is an advantage that the battery driving duration can be extended.

The shape of the negative electrode active material is not particularly limited but is preferably a particle shape. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a revolving airflow-type jet mill, a sieve, or the like is suitably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be calculated using an inductively coupled plasma (ICP) emission spectroscopic analysis method as a measurement method from the mass difference of powder before and after firing as a convenient method.

The negative electrode active material may be used singly, or two or more negative electrode active materials may be used in combination.

In case of forming a negative electrode active material layer, the mass (mg) of the negative electrode active material per unit area ($cm^2$) in the negative electrode active material layer (weight per unit area) is not particularly limited. The weight per unit area can be appropriately determined depending on a set battery capacity.

The content of the negative electrode active material in the solid electrolyte composition is not particularly limited but is preferably 10% to 80% by mass and more preferably 20% to 80% by mass with respect to a solid content of 100% by mass.

The surfaces of the positive electrode active material and the negative electrode active material may be coated with different metal oxides. Examples of the surface coating agents include a metal oxide and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, and $Al_2O_3$, $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an active light ray or an active gas (plasma or the like) before or after the coating of the surfaces.

(Binder)

The solid electrolyte composition of the embodiment of the present invention may also contain a binder.

The binder used in the solid electrolyte composition of the embodiment of the present invention is not particularly limited as long as it is an organic polymer.

The binder that can be used in the present invention is not particularly limited and for example, a binder made of a resin described below is preferable.

Examples of fluorine-containing resins include polytetrafluoroethylene (PTFE), polyvinylene difluoride (PVdF), and a copolymer of polyvinylene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, and polyisoprene.

Examples of acrylic resins include various (meth)acrylic monomers, (meth)acrylamide monomers, and copolymers of monomers constituting these resins.

In addition, copolymers with other vinyl monomers are also suitably used. For example, a poly-methyl (meth) acrylate-polystyrene copolymer, a poly-methyl(meth)acrylate-acrylonitrile copolymer, and a poly-butyl(meth)acrylate-acrylonitrile-styrene copolymer may be mentioned.

Examples of other resins include a polyurethane resin, a polyurea resin, a polyamide resin, a polyimide resin, a polyester resin, a polyether resin, a polycarbonate resin, and a cellulose derivative resin.

These materials may be used singly, or two or more kinds thereof may be used in combination.

The shape of the binder is not particularly limited and may be a particle shape or an irregular shape in the solid electrolyte composition or in the all-solid state secondary battery.

The polymer constituting the binder used in the present invention preferably has a water concentration of 100 ppm (by mass) or less.

Further, in case of forming a solid electrolyte-containing sheet or an all-solid state secondary battery, the polymer constituting the binder used in the present invention may be used in a solid state or in a state of a polymer particle dispersion liquid or a polymer solution.

The mass-average molecular weight of the polymer constituting the binder used in the present invention is preferably 10,000 or more, more preferably 20,000 or more, and still more preferably 30,000 or more. The upper limit is preferably 1,000,000 or less, more preferably 200,000 or less, and still more preferably 100,000 or less.

—Measurement of Molecular Weight—

In the present invention, unless particularly otherwise described, the molecular weight of the binder refers to a mass-average molecular weight, and a standard polystyrene-equivalent mass-average molecular weight is measured by gel permeation chromatography (GPC). Regarding a measurement method, basically, a value measured using a method under Conditions 1 or Conditions 2 (preferred) described below is employed. However, depending on the kind of the binder, an appropriate eluent may be appropriately selected and used.

(Conditions 1)

Column: Two TOSOH TSKgel® SuperAWM-H (trade name) are connected to each other.

Carrier: 10 mM LiBr/N-methyl pyrrolidone

Measurement temperature: 40° C.

Carrier flow rate: 1.0 mL/min

Concentration of specimen: 0.1% by mass

Detector: Refractive index (RI) detector (Conditions 2) Preferred

Column: A column obtained by connecting TOSOH TSKgel® SuperHZM-H (trade name), TOSOH TSKgel® SuperHZ4000 (trade name), and TOSOH TSKgel® SuperHZ2000 (trade name) is used.

Carrier: Tetrahydrofuran

Measurement temperature: 40° C.

Carrier flow rate: 1.0 mL/min

Concentration of specimen: 0.1% by mass

Detector: Refractive index (RI) detector

In the solid electrolyte composition of the embodiment of the present invention, the binder may be contained in an amount of 0.1 to 7 parts by mass or 0.2 to 5 parts by mass with respect to 100 parts by mass of the sulfide-based inorganic solid electrolyte.

(Dispersant)

The solid electrolyte composition of the embodiment of the present invention may also contain a dispersant. The addition of the dispersant enables the suppression of the agglomeration of the electrode active material and the sulfide-based inorganic solid electrolyte, and a uniform active material layer and a uniform solid electrolyte layer can be formed, even in a case where the content of any of the electrode active material or the sulfide-based inorganic solid electrolyte is high and/or in a case where the particle diameters of the electrode active material and the inorganic solid electrolyte are small and the surface area increases. As the dispersant, a dispersant that is generally used for an all-solid state secondary battery can be appropriately selected and used. Generally, a compound intended for particle adsorption and steric repulsion and/or electrostatic repulsion is suitably used.

(Lithium Salt)

The solid electrolyte composition of the embodiment of the present invention may also contain a lithium salt.

The lithium salt is not particularly limited, and, for example, the lithium salt described in Paragraphs 0082 to 0085 of JP2015-088486A is preferable.

The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

(Ionic Liquid)

The solid electrolyte composition of the embodiment of the present invention may also contain an ionic liquid in order to further improve the ion conductivity of individual layers constituting a solid electrolyte-containing sheet or an all-solid state secondary battery. The ionic liquid is not particularly limited but is preferably an ionic liquid dissolving the above-described lithium salt from the viewpoint of effectively improving ion conductivity. Examples thereof include compounds made of a combination of a cation and an anion described below.

(i) Cation

As the cation, an imidazolium cation, a pyridinium cation, a piperidinium cation, a pyrrolidinium cation, a morpholinium cation, a phosphonium cation, a quaternary ammonium cation, and the like are exemplified. Here, these cations have a substituent described below.

As the cation, these cations may be used singly or two or more cations can be used in combination.

A quaternary ammonium cation, a piperidinium cation, or a pyrrolidinium cation is preferable.

As the substituent that the cation has, an alkyl group (preferably having 1 to 8 carbon atoms and more preferably having 1 to 4 carbon atoms), a hydroxyalkyl group (preferably having 1 to 3 carbon atoms), an alkyloxyalkyl group (an alkyloxyalkyl group having 2 to 8 carbon atoms is preferable, and an alkyloxyalkyl group having 2 to 4 carbon atoms is more preferable), an ether group, an allyl group, an aminoalkyl group (an aminoalkyl group having 1 to 8 carbon atoms is preferable, and an aminoalkyl group having 1 to 4 carbon atoms is more preferable), and an aryl group (an aryl group having 6 to 12 carbon atoms is preferable, and an aryl group having 6 to 8 carbon atoms is more preferable) are exemplified. The substituent may form a cyclic structure in a form of containing a cation moiety. The substituent may further have a substituent described in the section of the dispersion medium. Meanwhile, the ether group can be used in combination with other substituents. As such a substituent, an alkyloxy group, an aryloxy group, and the like are exemplified.

(ii) Anion

As the anion, a chloride ion, a bromide ion, an iodide ion, a boron tetrafluoride ion, a nitric acid ion, a dicyanamide ion, an acetic acid ion, an iron tetrachloride ion, a bis(trifluoromethanesulfonyl)imide ion, a bis(fluorosulfonyl)imide ion, a bis(perfluorobutylmethanesulfonyl)imide ion, an allylsulfonate ion, a hexafluorophosphate ion, a trifluoromethanesulfonate ion, and the like are exemplified.

As the anion, these anions may be used singly or two or more anions may also be used in combination.

A boron tetrafluoride ion, a bis(trifluoromethanesulfonyl)imide ion, a bis(fluorosulfonyl)imide ion or a hexafluorophosphate ion, a dicyanamide ion, and an allylsulfonate ion are preferable, and a bis(trifluoromethanesulfonyl)imide ion or a bis(fluorosulfonyl)imide ion and an allylsulfonate ion are more preferable.

As the ionic liquid, for example, 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl) ammonium tetrafluoroborate, 1-ethyl-3-methylimidazolium bis(trifluoromethanesulfonyl)imide, 1-ethyl-3-methylimidazolium bis(fluorosulfonyl)imide, 1-ethyl-3-methylimidazolium dicyanamide, 1-butyl-1-methylpyrrolidinium bis(trifluoromethanesulfonyl)imide, trimethylbutylammonium bis(trifluoromethanesulfonyl)imide, N,N-diethyl-N-methyl-N-(2-methoxyethyl) ammonium bis(trifluoromethanesulfonyl)imide (DEME), N-propyl-N-methylpyrrolidinium bis(trifluoromethanesulfonyl)imide (PMP), N-(2-methoxyethyl)-N-methylpyrrolidinium tetrafluoroboride, 1-butyl-1-methylpyrrolidinium bis(fluorosulfonyl)imide, (2-acryloylethyl) trimethylammonium bis(trifluoromethanesulfonyl)imide, 1-ethyl-1-methylpyrrolidinium allyl sulfonate, 1-ethyl-3-methylimidazolium allylsulfonate, and trihexyltetradecylphosphonium chloride are exemplified.

The content of the ionic liquid is preferably 0 parts by mass or more, more preferably 1 part by mass or more, and most preferably 2 parts by mass or more with respect to 100 parts by mass of the sulfide-based inorganic solid electrolyte. The upper limit is preferably 50 parts by mass or less, more preferably 20 parts by mass or less, and particularly preferably 10 parts by mass or less.

The mass ratio of the lithium salt to the ionic liquid (the lithium salt:the ionic liquid) is preferably 1:20 to 20:1, more preferably 1:10 to 10:1, and most preferably 1:7 to 2:1.

(Conductive Auxiliary Agent)

The solid electrolyte composition of the embodiment of the present invention may also contain a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, and a polyphenylene derivative may also be used. In addition, these conductive auxiliary agents may be used singly or two or more conductive auxiliary agents may be used.

The conductive auxiliary agent may be contained in an amount of 0.5 to 5 parts by mass or 1 to 2 parts by mass in 100 parts by mass of the solid component of the solid electrolyte composition of the embodiment of the present invention.

(Preparation of Solid Electrolyte Composition)

The solid electrolyte composition of the embodiment of the present invention can be prepared by dispersing the sulfide-based inorganic solid electrolyte in the presence of the plurality of alkane dispersion media to prepare a slurry.

The slurry can be prepared by mixing the sulfide-based inorganic solid electrolyte and the plurality of alkane dispersion media using a variety of mixers.

The alkane dispersion medium may be mixed, for example, by mixing two or more kinds of alkane dispersion media with a sulfide-based inorganic solid electrolyte by an ordinary method and then mixing the mixed dispersion medium with the sulfide-based inorganic solid electrolyte, or two or more kinds of alkane dispersion media and a sulfide-based inorganic solid electrolyte may be separately added and mixed. The difference in the retention time of the alkane dispersion medium combined in consideration of the number of carbon atoms, structure, and the like of the alkane dispersion medium can be adjusted so as to be within 0.2 minutes.

The mixing device is not particularly limited, and examples thereof include a ball mill, a beads mill, a planetary mixer, a blade mixer, a roll mill, a kneader, and a disc mill. The mixing conditions are not particularly limited, but in case of using a ball mill, the inorganic solid electrolyte and the dispersion medium are preferably mixed together at 150 to 700 rotations per minute (rpm) for one hour to 24 hours.

In case of preparing a solid electrolyte composition containing components such as an active material and a dispersant, the components may be added and mixed simultaneously with a dispersion step of the sulfide-based inorganic solid electrolyte or may be separately added and mixed.

[Sheet for all-Solid State Secondary Battery]

The solid electrolyte-containing sheet of the embodiment of the present invention can be suitably used in all-solid state secondary batteries and is modified in a variety of aspects depending on the uses. Examples thereof include a sheet that is preferably used in a solid electrolyte layer (also referred to as a solid electrolyte sheet for an all-solid state secondary battery), a sheet that is preferably used in an electrode or a laminate of an electrode and a solid electrolyte layer (an electrode sheet for an all-solid state secondary battery), and the like. In the present invention, a variety of sheets described above will be collectively referred to as a sheet for an all-solid state secondary battery in some cases.

The sheet for an all-solid state secondary battery is a sheet having a solid electrolyte layer or an active material layer (electrode layer). This sheet for an all-solid state secondary battery may further have other layers as long as the sheet has the solid electrolyte layer or the active material layer, but a sheet containing an active material is classified into an electrode sheet for an all-solid state secondary battery described below. Examples of other layers include a protective layer, a collector, a coating layer (a collector, a solid electrolyte layer, or an active material layer), and the like.

Examples of the solid electrolyte sheet for an all-solid state secondary battery include a sheet having a solid electrolyte layer and a protective layer on a base material in this order and a sheet made of a solid electrolyte layer or an active material layer (electrode layer) (a sheet not having a base material).

The base material is not particularly limited as long as the base material is capable of supporting the solid electrolyte layer or the active material layer, and examples thereof include sheet bodies (plate-like bodies) of materials, organic materials, inorganic materials, and the like described in the section of the collector described below. Examples of the organic materials include a variety of polymers and the like, and specific examples thereof include polyethylene terephthalate, polypropylene, polyethylene, cellulose, and the like. Examples of the inorganic materials include glass, ceramic, and the like.

The layer thickness of the solid electrolyte layer in the sheet for an all-solid state secondary battery is identical to the layer thickness of the solid electrolyte layer described in the section of an all-solid state secondary battery of the embodiment of the present invention.

This sheet is obtained by making a film of the solid electrolyte composition of the embodiment of the present invention (by means of application and drying) on the base material (possibly, through other layers) and forming a solid electrolyte layer on the base material. The base material may be a sheet made of a solid electrolyte layer peeled off from the solid electrolyte layer.

Here, the solid electrolyte composition of the embodiment of the present invention can be prepared using the above-described method.

An electrode sheet for an all-solid state secondary battery of the embodiment of the present invention (also simply referred to as "the electrode sheet") is an electrode sheet for forming an active material layer in an all-solid state secondary battery of the embodiment of the present invention and having an active material layer on a metal foil as a collector. This electrode sheet is generally a sheet having a collector and an active material layer, and an aspect of having a collector, an active material layer, and a solid electrolyte layer in this order and an aspect of having a collector, an active material layer, a solid electrolyte layer, and an active material layer in this order are also considered as the electrode sheet.

The layer thicknesses of the respective layers constituting the electrode sheet are identical to the layer thicknesses of individual layers described in the section of an all-solid state secondary battery of the embodiment of the present invention.

The electrode sheet is obtained by making a film of the solid electrolyte composition of the embodiment of the present invention which contains the active material (by means of application and drying) on the metal foil and forming an active material layer on the metal foil. A method for preparing the solid electrolyte composition containing the active material is the same as the method for preparing the solid electrolyte composition except for the fact that the active material is used.

The solid electrolyte-containing sheet may contain an alkane dispersion medium in each layer. Specifically, the content of the alkane dispersion medium in the total mass of each layer is preferably 1,000 ppm or less, and more preferably 100 ppm or less. The lower limit is, for example, 10 ppm or more and may be 0 ppm.

The content of the alkane dispersion medium in each layer can be measured by cutting the sheet and performing gas chromatography.

[All-Solid State Secondary Battery]

An all-solid state secondary battery of the embodiment of the present invention has a positive electrode, a negative electrode facing the positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the negative electrode active material layer, the positive electrode active material layer, or the solid electrolyte layer is the solid electrolyte-containing sheet of the embodiment of the present invention.

In the active material layer and/or the solid electrolyte layer formed of the solid electrolyte composition, the kinds of the components being contained and content ratios thereof are preferably the same as the solid content of the solid electrolyte composition.

Hereinafter, the all-solid state secondary battery of the preferred embodiments of the present invention will be described with reference to FIG. 1, but the present invention is not limited thereto.

FIG. 1 is a cross-sectional view schematically illustrating an all-solid state secondary battery (lithium ion secondary battery) according to a preferred embodiment of the present invention. In case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. Each layer is in contact with each other and forms a laminated structure. In a case where the above-described structure is employed, during charging, electrons (e$^-$) are supplied to the negative electrode side, and lithium ions (Li$^+$) are accumulated on the negative electrode side. On the other hand, during discharging, the lithium ions (Li$^+$) accumulated on the negative electrode side return to the positive electrode, and electrons are supplied to an operation portion 6. In an example illustrated in the drawing, an electric bulb is employed as the operation portion 6 and is lit by discharging. The solid electrolyte composition of the embodiment of the present invention can be preferably used as a material forming the negative electrode active material layer, the positive electrode active material layer, and the solid electrolyte layer. In addition, the solid electrolyte-containing sheet of the embodiment of the present invention is suitable as the negative electrode active material layer, the positive electrode active material layer, and the solid electrolyte layer.

In the present specification, the positive electrode active material layer (hereinafter, also referred to as the positive electrode layer) and the negative electrode active material layer (hereinafter, also referred to as the negative electrode layer) will be collectively referred to as the electrode layer or the active material layer in some cases.

The thicknesses of the positive electrode active material layer 4, the solid electrolyte layer 3, and the negative electrode active material layer 2 are not particularly limited. Meanwhile, in a case where the dimensions of ordinary batteries are taken into account, the thicknesses are preferably 10 to 1,000 μm and more preferably 20 μm or more and less than 500 μm. In addition, in the all-solid state secondary battery of the embodiment of the present invention the thickness of the solid electrolyte layer 3 can be set to, for example, 5 μm or more and 100 μm or less (preferably 10 μm or more and 50 μm or less), by using the solid electrolyte composition of the embodiment of the present invention.

[Positive Electrode Active Material Layer, Solid Electrolyte Layer, and Negative Electrode Active Material Layer]

In the all-solid state secondary battery 10, at least one of the positive electrode active material layer, the solid electrolyte layer, or the negative electrode active material layer is formed using the solid electrolyte composition of the embodiment of the present invention.

In a case where the positive electrode active material layer 4 and/or the negative electrode active material layer 2 is formed using the solid electrolyte composition of the embodiment of the present invention, the positive electrode active material layer 4 and the negative electrode active material layer 2 each include a positive electrode active material or a negative electrode active material and further include the sulfide-based inorganic solid electrolyte. In a case where the active material layers contain the sulfide-based inorganic solid electrolyte, it is possible to improve the ion conductivity.

The sulfide-based inorganic solid electrolyte that the positive electrode active material layer 4, the solid electrolyte layer 3, and the negative electrode active material layer 2 contain may be identical to or different from each other.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferable, and, among these, aluminum and an aluminum alloy are more preferable.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited but is preferably 1 to 500 μm. In addition, the surface of the collector is preferably provided with protrusions and recesses by means of a surface treatment.

In the present invention, a functional layer, a functional member, or the like may be appropriately interposed or disposed between each layer of the negative electrode collector, the negative electrode active material layer, the solid electrolyte layer, the positive electrode active material layer, and the positive electrode collector or on the outside thereof. In addition, each layer may be constituted of a single layer or multiple layers.

[Chassis]

It is possible to produce the basic structure of the all-solid state secondary battery by disposing the individual layers described above. Depending on the use, the basic structure may be directly used as an all-solid state secondary battery, but the basic structure may be used after being enclosed in an appropriate chassis in order to have a dry battery form. The chassis may be a metallic chassis or a resin (plastic) chassis. In a case where a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

[Manufacturing of Solid Electrolyte-Containing Sheet]

The solid electrolyte-containing sheet of the embodiment of the present invention is obtained, for example, by making a film of the solid electrolyte composition of the embodiment of the present invention on a base material (possibly, through a different layer) (application and drying) and forming a solid electrolyte layer or an active material layer (applied dried layer) on the base material.

With the above-described aspect, it is possible to produce a sheet for an all-solid state secondary battery that is a sheet having a base material and an applied dried layer. Here, the applied dried layer refers to a layer formed by applying the solid electrolyte composition of the embodiment of the present invention and drying the dispersion medium (that is, a layer formed using the solid electrolyte composition of the embodiment of the present invention and removing the dispersion medium from the solid electrolyte composition of the embodiment of the present invention).

Additionally, regarding steps such as application, it is possible to use a method described in the following section of the manufacturing of an all-solid state secondary battery.

[Manufacturing of all-Solid State Secondary Battery and Electrode Sheet for all-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the individual layers described above using the solid electrolyte composition of the embodiment of the present invention or the like. Hereinafter, the manufacturing of the all-solid state secondary battery and the electrode sheet for an all-solid state secondary battery will be described in detail.

The all-solid state secondary battery of the embodiment of the present invention can be manufactured using a method including (through) a step of applying the solid electrolyte composition of the embodiment of the present invention onto a metal foil which serves as a collector and forming a coating film (making a coating film).

For example, a solid electrolyte composition containing a positive electrode active material is applied as a material for a positive electrode (a composition for a positive electrode) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming individual layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery constituted of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above. In this way, even in a region in at least one layer of the positive electrode active material layer or the negative electrode active material layer in which the content of the sulfide-based inorganic solid electrolyte is as low as 10% by mass or less, the adhesiveness between the active material and the sulfide-based inorganic solid electrolyte, an efficient ion conduction path can be maintained, and it is possible to manufacture an all-solid state secondary battery having a high energy density (Wh/kg) and a high output density (W/kg) per battery mass.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced individually. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the compositions are heated in the above-described temperature range, it is possible to remove the dispersion medium to form a solid state. This temperature range is preferable since the temperature is not excessively increased and each member of the all-solid state secondary battery is not impaired. Therefore, in the all-solid state secondary battery, excellent total performance is exhibited, and it is possible to obtain a favorable binding property.

After the production of the applied solid electrolyte composition or the all-solid state secondary battery, each of the layers or the all-solid state secondary battery is preferably pressurized. In addition, each of the layers is also preferably pressurized together in a state of being laminated. Examples of the pressurization methods include a method using a hydraulic cylinder pressing machine and the like. The welding pressure is not particularly limited but is, generally, preferably in a range of 50 to 1,500 MPa.

In addition, the applied solid electrolyte composition may be heated at the same time as pressurization. The heating temperature is not particularly limited but is generally in a range of 30° C. to 300° C. Each of the layers or the all-solid state secondary battery can also be pressed at a temperature higher than the glass transition temperature of the sulfide-based inorganic solid electrolyte.

The pressurization may be carried out in a state in which the applied solvent or dispersion medium has been dried in advance or in a state in which the solvent or the dispersion medium remains.

The individual compositions may be applied at the same time, and the application, the drying, and the pressing may be carried out simultaneously and/or sequentially. The individual compositions may be applied to separate base materials and then laminated by means of transfer.

The atmosphere during the pressurization is not particularly limited and may be any one of the atmosphere such as an atmosphere under the dried air (the dew point: −20° C. or lower), in an inert gas (for example, in an argon gas, in a helium gas, or in a nitrogen gas), and the like.

The pressurization time may be a short time (for example, within several hours) under the application of a high pressure or a long time (one day or longer) under the application of an intermediate pressure. In case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to change the pressure to a pressure that varies stepwise at the same portion.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure to a pressure at which the all-solid state secondary battery is ordinarily used.

[Usages of all-Solid State Secondary Battery]

The all-solid state secondary battery of the embodiment of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include vehicles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with a solar battery.

According to the preferred embodiment of the present invention, individual application forms as described below are derived.

[1] All-solid state secondary batteries in which all layers of a positive electrode active material layer, a solid electrolyte layer, and a negative electrode active material layer are layers made of the solid electrolyte composition of the embodiment of the present invention.

[2] A method for manufacturing an all-solid state secondary battery in which a solid electrolyte layer is made into a film by wet-type coating of a slurry in which a sulfide-based inorganic solid electrolyte, binder, and/or a conductive auxiliary agent are dispersed.

[3] A solid electrolyte composition containing a sulfide-based inorganic solid electrolyte, an active material, a binder and/or a conductive auxiliary agent.

[4] An electrode sheet for a battery obtained by applying the solid electrolyte composition onto a metal foil to make a film.

[5] A method for manufacturing an electrode sheet for a battery in which the solid electrolyte composition is applied onto a metal foil to make a film.

All-solid state secondary batteries refer to secondary batteries having a positive electrode, a negative electrode, and an electrolyte, all of which are constituted of solid. In other words, all-solid state secondary batteries are differentiated from electrolytic solution-type secondary batteries in which a carbonate-based solvent is used as an electrolyte. Among these, the present invention is based on an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S-based glass, LLT, LLZ, or the like is used. Meanwhile, the application of organic compounds to inorganic all-solid state secondary batteries is not inhibited, and organic compounds can also be applied as binders or additives of positive electrode active materials, negative electrode active materials, and inorganic solid electrolytes.

Inorganic solid electrolytes are differentiated from electrolytes in which the above-described polymer compound is used as an ion conductive medium (polymer electrolyte), and inorganic compounds serve as ion conductive media. Specific examples thereof include the Li—P—S glass, LLT, and LLZ. Inorganic solid electrolytes do not deintercalate positive ions (Li ions) and exhibit an ion transportation function. In contrast, there are cases in which materials serving as an ion supply source which is added to electrolytic solutions or solid electrolyte layers to deintercalate positive ions (Li ions) are referred to as electrolytes. However, in case of being differentiated from electrolytes as the ion transportation materials, the materials are referred to as "electrolyte salts" or "supporting electrolytes". Examples of the electrolyte salts include LiTFSI.

In the present invention, "composition" refers to mixture obtained by uniformly mixing two or more components. Here, the composition may partially include aggregation or uneven distribution as long as the composition substantially maintains uniformity and exhibits desired effects.

EXAMPLES

Hereinafter, the present invention will be described in more detail on the basis of Examples. It is noted that the present invention is not interpreted to be limited thereto. "Room temperature" refers to 25° C. In addition, "–" used in Table means that the component in the column is not contained.

<Synthesis of Sulfide-Based Inorganic Solid Electrolyte Li—P—S-Based Glass>

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: –70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed and put into an agate mortar. The molar ratio of $Li_2S$ to $P_2S_5$ was set to 75:25 ($Li_2S:P_2S_5$). $Li_2S$ and $P_2S_5$ were mixed in the agate mortar using an agate muddler for five minutes.

66 g of zirconia beads having a diameter of 5 mm were put into a 45 mL zirconia container (manufactured by Fritsch Japan Co., Ltd.), the total amount of the mixture was put thereinto, and the container was sealed in an argon atmosphere. The container was set in a planetary ball mill P-7 (trade name) manufactured by Fritsch Japan Co., Ltd., mechanical milling was carried out at 25° C. and a rotation speed of 510 rpm for 20 hours, thereby obtaining yellow powder (6.20 g) of a sulfide-based inorganic solid electrolyte (Li—P—S-based glass).

Example 1

In Example 1, a solid electrolyte composition was prepared, and a solid electrolyte sheet for an all-solid state secondary battery was produced using the solid electrolyte composition, and then the solid electrolyte sheet for an all-solid state secondary battery was tested for layer uniformity and reproducibility.

(Preparation of Solid Electrolyte Composition A-1)

The Li—P—S-based glass and PVdF (manufactured by Aldrich-Sigma, Co. LLC, mass-average molecular weight: 180,000) were mixed at a mass ratio of 97:3 and added to a planetary mixer (manufactured by PRIMIX Corporation). MC-1500 SOLVENT (trade name, a mixed solvent of hydrocarbons manufactured by Sankyo Chemical Co., Ltd.) was added to this planetary mixer as a dispersion medium so that the concentration of solid content was 30% by mass, and the mixture was stirred at 50 rpm for 1 hour at room temperature to obtain a solid electrolyte composition (slurry) A-1.

Solid electrolyte compositions A-2, A-3, A-4, and B-1 to B-8 were prepared in the same manner as the solid electrolyte composition A-1 except that the dispersion media described in Table 1 below were used instead of the MC-1500 SOLVENT.

Hereinafter, measurement conditions and measurement results of gas chromatography of the dispersion media used for preparing the solid electrolyte composition will be described.

<Conditions for Gas Chromatography>

Model used: GC-2010 (manufactured by Shimadzu Corporation)

Column: Agilent J&W GC COLUMN (manufactured by Agilent Technologies Inc.), 30 m, 0.25 mmφ, 40° C.

Injection amount: 1 µL of a solution obtained by dissolving 25 mg of a plurality of alkane dispersion media in 25 ml of ethyl acetate Mobile phase (carrier gas): He Temperature rising: After held at 40° C. for 2 minutes, the temperature was raised to 300° C. at a rate of 10° C./minute and held at 300° C. for 5 minutes.

A sample was injected in split mode at a split ratio of 20:1.

A measurement time is 50 minutes from a sample injection.

Detector: FID

MC-1500 SOLVENT (mixed solvent of hydrocarbons, trade name, manufactured by Sankyo Chemical Co., Ltd.)

29 peaks were detected from 5.02 minutes to 7.36 minutes.

The maximum difference in retention time between the mutually adjacent peaks was 0.182 minutes.

The retention time of the alkane dispersion medium having the largest peak surface area (13.1% of the total peak surface area (the content proportion in the total alkane dispersion media was 13.1% by mass)) was 6.34 minutes.

The retention time of the alkane dispersion medium having the smallest peak surface area (0.12% of the total peak surface area (the content proportion in the total alkane dispersion media was 0.12% by mass)) was 5.31 minutes.

MC-2000 SOLVENT (mixed solvent of hydrocarbons, trade name, manufactured by Sankyo Chemical Co., Ltd.)

27 peaks were detected from 5.08 minutes to 7.8 minutes. The maximum difference in retention time between the mutually adjacent peaks was 0.173 minutes.

The retention time of the alkane dispersion medium having the largest peak surface area (22.0% of the total peak surface area (the content proportion in the total alkane dispersion media was 22.0% by mass)) was 6.34 minutes.

The retention time of the alkane dispersion medium having the smallest peak surface area (0.20% of the total peak surface area (the content proportion in the total alkane dispersion media was 0.20% by mass)) was 6.48 minutes.

MC-3000S SOLVENT (mixed solvent of petroleum-based hydrocarbons, trade name, manufactured by Sankyo Chemical Co., Ltd.)

31 peaks were detected from 8.53 minutes to 11.13 minutes.

The maximum difference in retention time between the mutually adjacent peaks was 0.142 minutes.

The retention time of the alkane dispersion medium having the largest peak surface area (8.27% of the total peak surface area (the content proportion in the total alkane dispersion media was 8.27% by mass)) was 10.87 minutes.

The retention time of the alkane dispersion medium having the smallest peak surface area (0.24% of the total peak surface area (the content proportion in the total alkane dispersion media was 0.24% by mass)) was 8.53 minutes.

MC-1500 SOLVENT Distilled Product

The MC-1500 SOLVENT was distilled at atmospheric pressure and 150° C. to obtain an MC-1500 SOLVENT distilled product.

8 peaks were detected from 5.02 minutes to 5.60 minutes.

The maximum difference in retention time between the mutually adjacent peaks was 0.150 minutes.

The retention time of the alkane dispersion medium having the largest peak surface area (62.6% of the total peak surface area (the content proportion in the total alkane dispersion media was 62.6% by mass)) was 5.5 minutes.

The retention time of the alkane dispersion medium having the smallest peak surface area (1.6% of the total peak surface area (the content proportion in the total alkane dispersion media was 1.6% by mass)) was 5.3 minutes.

One kind of dispersion medium (retention time was measured by gas chromatography under the same conditions as a plurality of alkane dispersion media.)

Retention time of heptane: 3.2 minutes (single peak)
Retention time of octane: 4.2 minutes (single peak)
Retention time of decane: 8.2 minutes (single peak)
Mixture of two kinds of dispersion media (mixed at a mass ratio of 1:1)
Retention time of heptane: 3.2 minutes (single peak)
Retention time of decane: 8.2 minutes (single peak)
Difference in retention time=5.0 minutes
Mixture of three kinds of dispersion media (mixed at a mass ratio of 1:1:1)
Retention time of heptane: 3.2 minutes (single peak)
Retention time of octane: 4.2 minutes (single peak)
Retention time of decane: 8.2 minutes (single peak)
Difference in retention time=1.0 minutes and 4.0 minutes (Production of Solid Electrolyte Sheet A-1 for all-Solid State Secondary Battery)

The slurry A-1 was applied onto a carbon-coated aluminum foil (7 cm×20 cm) having a thickness of 20 µm to have an application area of 7 cm×12 cm by using an applicator (trade name: SA-201, a Baker-type applicator, manufactured by Tester Sangyo Co., Ltd.), and a solid electrolyte sheet A-1 (thickness of solid electrolyte layer: 100 µm) for an all-solid state secondary battery was obtained by heating and drying at 100° C. for 2 hours.

Each of solid electrolyte sheets A-2 to A-4 and B-1 to B-8 for an all-solid state secondary battery was produced in the same manner as the solid electrolyte sheet A-1 for an all-solid state secondary battery except that the solid electrolyte compositions A-2 to A-4 and B-1 to B-8 were used instead of the solid electrolyte composition A-1. The thicknesses of all of the solid electrolyte layers were 100 µm.

<Test of Layer Uniformity and Layer Reproducibility>

The solid electrolyte sheet (rectangular sheet in a plan view having 7 cm in a short-axis direction and 12 cm in a long-axis direction) for an all-solid state secondary battery produced above was punched out as follows, and a 10 mmφ solid electrolyte sheet for an all-solid state secondary battery was obtained. The mass of the solid electrolyte layer of this solid electrolyte sheet for an all-solid state secondary battery was measured.

A circular sheet 1 of 10 mmφ having a center at a point 1.5 cm away from one end in the 7 cm direction (short-axis direction) and 4.5 cm away from the end of the side where the solid electrolyte composition started to be applied by the applicator in the 12 cm direction (long-axis direction) was punched out. A circular sheet 2 of 10 mmφ was punched out at the side in the short-axis direction opposite to the end in the above short-axis direction with respect to the punched portion of the sheet 1. The shortest distance between the sheet 1 and the sheet 2 was 1 cm. A circular sheet 3 of 10 mmφ was punched out at the side in the short-axis direction opposite to the end in the above short-axis direction with respect to the punched portion of the sheet 2. The shortest distance between the sheet 2 and the sheet 3 was 1 cm.

A circular sheet 4 of 10 mmφ having a center at a point 1.5 cm away from one end in the short-axis direction and 6 cm away from the end of the side where the solid electrolyte composition started to be applied by the applicator in the long-axis direction was punched out. A circular sheet 5 of 10 mmφ was punched out at the side in the short-axis direction opposite to the end in the above short-axis direction with respect to the punched portion of the sheet 4. The shortest distance between the sheet 4 and the sheet 5 was 1 cm. A circular sheet 6 of 10 mmφ was punched out at the side in the short-axis direction opposite to the end in the above short-axis direction with respect to the punched portion of the sheet 5. The shortest distance between the sheet 5 and the sheet 6 was 1 cm.

A circular sheet 7 of 10 mmφ having a center at a point 1 cm away from one end in the short-axis direction and 8 cm away from the end of the side where the solid electrolyte composition started to be applied by the applicator in the long-axis direction was punched out. A circular sheet 8 of 10 mmφ was punched out at the side in the short-axis direction opposite to the end in the above short-axis direction with respect to the punched portion of the sheet 7. The shortest distance between the sheet 7 and the sheet 8 was 1 cm. A circular sheet 9 of 10 mmφ was punched out at the side in the short-axis direction opposite to the end in the above short-axis direction with respect to the punched portion of the sheet 8. The shortest distance between the sheet 8 and the sheet 9 was 1 cm.

As described above, nine circular sheets were punched out of the solid electrolyte sheet for an all-solid state secondary battery. Similarly, nine circular sheets were punched out of each of other two solid electrolyte sheets A-1 for an all-solid state secondary battery to obtain a total of 18 circular sheets. The variation in the mass of the obtained 27 circular sheets was calculated.

In Table 1 below, the average value and the standard deviation of the mass (not including the mass of the aluminum foil) of the layers of 27 circular sheets are shown with respect to the dispersion medium used for the slurry and each of the solid electrolyte sheets for an all-solid state secondary battery.

TABLE 1

| Sheet No. | Dispersion medium used for preparation of solid electrolyte composition | Standard deviation | Average value (mg) |
|---|---|---|---|
| A-1 | MC-1500 Solvent | 0.21 | 5.98 |
| A-2 | MC-2000 Solvent | 0.21 | 6.01 |
| A-3 | MC-3000S Solvent | 0.15 | 5.99 |
| A-4 | Distilled MC-1500 Solvent | 0.21 | 5.99 |
| B-1 | Heptane | 0.49 | 6.03 |
| B-2 | Octane | 0.64 | 5.91 |
| B-3 | Decane | 0.75 | 6.09 |
| B-4 | Undecane | 0.49 | 6.06 |
| B-5 | Cyclohexane | 0.69 | 5.96 |
| B-6 | Cyclohepatne | 0.66 | 5.97 |
| B-7 | Heptane + Decane | 0.42 | 6.01 |
| B-8 | Heptane + Octane + Decane | 0.44 | 5.97 |

The solid electrolyte sheets No. B-1 to B-6 for an all-solid state secondary battery were produced using a solid electrolyte composition containing one kind of dispersion medium, and the standard deviation was large as clearly shown in Table 1. Further, the solid electrolyte sheets B-7 and B-8 for an all-solid state secondary battery were produced using a solid electrolyte composition containing a plurality of kinds of dispersion media, but the difference in retention time between the mutually adjacent peaks exceeded 0.2 minutes, and the standard deviation was large.

On the other hand, it can be seen that the solid electrolyte sheets No. A-1 to A-4 for an all-solid state secondary battery have a small standard deviation and excellent uniform dispersibility of solid particles, and can form a solid electrolyte layer with high reproducibility.

This indicates that the use of the solid electrolyte composition of the embodiment of the present invention as a layer constituent material of an all-solid state secondary battery can provide an all-solid state secondary battery with high reproducibility.

Example 2

In Example 2, a composition for a positive electrode was prepared, a positive electrode sheet was prepared using the composition for positive electrode, and the discharging capacity of the positive electrode sheet was measured.

(Preparation of Composition C-1 for a Positive Electrode)
Step 1

160 zirconia beads having a diameter of 5 mm were put into a 45 mL zirconia container (manufactured by Fritsch Japan Co., Ltd.), and 4.0 g of the Li—P—S glass and 6 g of MC-3000S SOLVENT (dispersion medium 1 in Table 2 below) were added thereto. Then, the container was set in a planetary ball mill P-7 manufactured by Fritsch Japan Co., Ltd., and wet-type dispersion was performed at 350 rpm at room temperature for 60 minutes to obtain a solid electrolyte composition (slurry 1).

Step 2

10.5 g of a positive electrode active material (lithium nickel manganese cobalt oxide), 0.3 g of acetylene black (conductive auxiliary agent), and 8 g of MC-3000S SOLVENT (dispersion medium 1 in Table 2 below) were added to 11 g of the slurry 1 obtained as described above, and the container was set in a planetary ball mill P-7 manufactured by Fritsch Japan Co., Ltd., and wet-type dispersion was performed at room temperature and a rotation speed of 150 rpm for 10 minutes to obtain a composition C-1 for a positive electrode (slurry 2).

(Preparation of composition C-2 for positive electrode)
Step 1

160 zirconia beads having a diameter of 5 mm were put into a 45 mL zirconia container (manufactured by Fritsch Japan Co., Ltd.), and 4.0 g of the Li—P—S glass and 6 g of a mixed dispersion medium (dispersion medium 1 in Table 2 below) of MC-3000S SOLVENT and dibutyl ether (dispersion medium 2 in Table 2 below) (mass ratio, 90:10) were added thereto. Then, the container was set in a planetary ball mill P-7 manufactured by Fritsch Japan Co., Ltd., and wet-type dispersion was performed at 350 rpm at room temperature for 60 minutes to obtain a solid electrolyte composition (slurry 3).

Step 2

10.5 g of a positive electrode active material (lithium nickel manganese cobalt oxide), 8 g of acetylene black (conductive auxiliary agent), and 8 g of the mixed dispersion medium were added to 11 g of the slurry 3 obtained as described above, and the container was set in a planetary ball mill P-7 manufactured by Fritsch Japan Co., Ltd., and wet-type dispersion was performed at room temperature and a rotation speed of 150 rpm for 10 minutes to obtain a composition C-2 for a positive electrode (slurry 4).

Compositions C-3, C-4, D-1, D-2, E-1, E-2, F-1, F-2, G-1, and G-2 for a positive electrode were prepared in the same manner as the composition C-1 or C-2 for a positive electrode except that the dispersion media shown in Table 1 below were used.

In the compositions E-1 and E-2 for a positive electrode, a mixed dispersion medium of MC-2000 SOLVENT and cyclohexane (mass ratio, 85:15) was used as the dispersion medium 1.

In addition, in the compositions G-1 and G-2 for a positive electrode, a mixed dispersion medium of heptane, octane and decane (mass ratio, 1:1:1) was used as the dispersion medium 1.

(Preparation of Positive Electrode Sheet C-1)

The obtained slurry 4 was applied onto a carbon-coated aluminum foil (7 cm×20 cm) having a thickness of 20 μm to have an application area of 7 cm×12 cm by using an applicator (trade name: SA-201, a Baker-type applicator, manufactured by Tester Sangyo Co., Ltd.), and a positive electrode sheet C-1 (thickness of positive electrode active material layer: 80 μm) for an all-solid state secondary battery was obtained by heating and drying at 100° C. for 1 hour.

Positive electrode sheets C-2, C-3, C-4, D-1, D-2, E-1, E-2, F-1, F-2, G-1, and G-2 were respectively produced in the same manner as the positive electrode sheet C-1 except that the compositions C-2, C-3, C-4, D-1, D-2, E-1, E-2, F-1, F-2, G-1, and G-2 for a positive electrode were used instead of the positive electrode composition C-1. The thicknesses of the positive electrode active material layers were 80 μm.

<Evaluation of Battery Characteristics>

The positive electrode sheets produced above were punched out as follows to obtain positive electrode sheets of 10 mmφ. The battery characteristics were evaluated using these positive electrode sheets.

A circular sheet (1) of 10 mmφ having a center at a point 1 cm away from one end in the 7 cm direction (short-axis direction) and 4 cm away from the end of the side where the composition for a positive electrode started to be applied by the applicator in the 12 cm direction (long-axis direction) was punched out. A circular sheet (2) of 10 mmφ was punched out at the side in the short-axis direction opposite to the end in the above short-axis direction with respect to the punched portion of the sheet (1). The shortest distance between the sheet (1) and the sheet (2) was 1 cm. A circular sheet (3) of 10 mmφ was punched out at the side in the short-axis direction opposite to the end in the above short-axis direction with respect to the punched portion of the sheet (2). The shortest distance between the sheet (2) and the sheet (3) was 1 cm.

A circular sheet (4) of 10 mmφ having a center at a point 1 cm away from one end in the short-axis direction and 6 cm away from the end of the side where the composition for a positive electrode started to be applied by the applicator in the long-axis direction was punched out. A circular sheet (5) of 10 mmφ was punched out at the side in the short-axis direction opposite to the end in the above short-axis direction with respect to the punched portion of the sheet (4). The shortest distance between the sheet (4) and the sheet (5) was 1 cm. A circular sheet (6) of 10 mmφ was punched out at the side in the short-axis direction opposite to the end in the above short-axis direction with respect to the punched portion of the sheet (5). The shortest distance between the sheet (5) and the sheet (6) was 1 cm.

A circular sheet (7) of 10 mmφ having a center at a point 1 cm away from one end in the short-axis direction and 8 cm away from the end of the side where the composition for a positive electrode started to be applied by the applicator in the long-axis direction was punched out. A circular sheet (8) of 10 mmφ was punched out at the side in the short-axis direction opposite to the end in the above short-axis direction with respect to the punched portion of the sheet (7). The shortest distance between the sheet (7) and the sheet (8) was 1 cm. A circular sheet (9) of 10 mmφ was punched out at the side in the short-axis direction opposite to the end in the above short-axis direction with respect to the punched portion of the sheet (8). The shortest distance between the sheet (8) and the sheet (9) was 1 cm.

As described above, each of the positive electrode sheets was punched out at a total of nine positions to obtain nine positive electrode sheets (10 mmφ).

The disk-shaped positive electrode sheet obtained as described above and having a diameter of 10 mmφ was placed in a 10 mmφ cylinder made of polyethylene terephthalate (PET). 30 mg of a powder of the Li—P—S-based glass was placed on the surface side of the positive electrode active material layer in the cylinder, and a SUS rod of 10 mmφ was inserted from both sides of the cylinder. Pressure was applied from the aluminum foil side of the positive electrode sheet and the Li—P—S-based glass powder side by applying a pressure of 350 MPa with a SUS rod. The SUS rod on the Li—P—S-based glass powder side was once removed, and a 9 mmφ disk-shaped indium (In) sheet (thickness: 20 μm) and a 9 mmφ Li sheet (thickness: 20 μm) were inserted on the Li—P—S-based glass powder in a cylinder. The removed SUS rod was inserted again into the cylinder and the sheets were fixed while applying a pressure of 50 MPa. In this way, an all-solid state secondary battery having a structure of a aluminum foil (thickness: 20 μm)—a positive electrode active material layer (thickness: 50 μm)—a sulfide-based inorganic solid electrolyte layer (thickness: 200 μm)—a negative electrode active material layer (In/Li sheet) was obtained. No. of the all-solid state secondary battery shown in Table below corresponds to No. of the positive electrode sheet.

The discharging and discharging characteristics of the produced all-solid state secondary batteries were measured using a charging and discharging evaluation device (TOSCAT-3000) manufactured by Toyo systems Development Co., Ltd.). Charging was performed at a current density of 0.5 mA/cm$^2$ until the charging voltage reached 3.6 V, and after reaching 3.6 V, charging was performed at a constant voltage until the current density became less than 0.05 mA/cm$^2$. Discharging was performed at a current density of 0.5 mA/cm$_2$ until the voltage reached 1.9 V, which was repeated to compare the discharging capacity in the third cycle.

The average value of the discharging capacity of an all-solid state secondary battery of No. C-1 was set to 1 (dimensionless since Ah is normalized), and the average value of the normalized discharging capacity of 9 elements in each of the conditions and the normalized standard deviation of the discharging capacity are shown in Table 2 below.

TABLE 2

| All-solid state secondary battery No. | Dispersion medium 1 | Dispersion medium 2 | Ratio of Dispersion 1 (% by mass) | Average value of discharging capacity | Standard deviation |
| --- | --- | --- | --- | --- | --- |
| C-1 | MC-3000S | — | 100 | 1.00 | 0.011 |
| C-2 | Solvent | Dibutyl ether | 90 | 1.76 | 0.012 |
| C-3 | | Butyl butyrate | 90 | 1.85 | 0.012 |
| C-4 | | Diisobutyl ketone | 90 | 2.17 | 0.009 |
| D-1 | MC-2000 | — | 100 | 0.98 | 0.015 |
| D-2 | Solvent | Dibutyl ehter | 90 | 1.63 | 0.015 |
| E-1 | MC-2000 | — | 100 | 1.09 | 0.013 |
| E-2 | Solvent + Cyclohexane | Dibutyl eliter | 90 | 1.72 | 0.007 |
| F-1 | Heptane | — | 100 | 0.87 | 0.081 |
| F-2 | | Dibutyl ehter | 90 | 1.52 | 0.091 |

TABLE 2-continued

| All-solid state secondary battery No. | Dispersion medium 1 | Dispersion medium 2 | Ratio of Dispersion 1 (% by mass) | Average value of discharging capacity | Standard deviation |
|---|---|---|---|---|---|
| G-1 | Heptane + | — | 100 | 0.93 | 0.097 |
| G-2 | Octane + Decane | Dibutyl ehter | 90 | 1.57 | 0.105 |

It can be seen that all-solid state secondary batteries No. C-1 to C-4, D-1, D-2, E-1, and E-2 have smaller standard deviations than all-solid state secondary batteries No. F-1, F-2, G-1, and G-1 have excellent uniform dispersibility of solid particles, and are all-solid state secondary batteries in which an intended solid electrolyte layer and positive electrode active material layer are formed with high reproducibility.

In a case where the all-solid state secondary battery No. D-1 and the all-solid state secondary battery No. E-1 were compared, the all-solid state secondary battery No. E-1 containing cyclohexane which is a cyclic alkane had a larger discharging capacity. Similarly, in a case where the all-solid state secondary battery No. D-2 and the all-solid state secondary battery No. E-2 were compared, the all-solid state secondary battery No. E-2 had a larger discharging capacity.

It has also been found that in the all-solid state secondary batteries No. C-1 to C-4, D-1, D-2, E-1, and E-2, addition of a polar solvent (dispersion medium 2) in addition to the dispersion medium 1 improves discharging capacity.

The present invention has been described together with the embodiment, however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery

What is claimed is:

1. A solid electrolyte composition comprising:
a sulfide-based inorganic solid electrolyte; and
a plurality of kinds of alkane dispersion media having, with respect to a peak of each alkane dispersion medium obtained by a measurement under the following conditions using a gas chromatography, a number of combinations of the alkane dispersion media in which a difference in a retention time between mutually adjacent peaks is within 0.2 minutes is 6 or more, wherein the retention times of all peaks are 4 to 17 minutes, and a proportion of the alkane dispersion medium having the largest content in the plurality of alkane dispersion media is 70% by mass or less,
<conditions for gas chromatography>
column: Agilent J&W GC COLUMN manufactured by Agilent Technologies Inc., 30 m, 0.25 mmφ, 40° C.;
injection amount: 1 μL of a solution obtained by dissolving 25 mg of a plurality of kinds of alkane dispersion media in 25 ml of ethyl acetate;
mobile phase: He;
temperature rising: after held at 40° C. for 2 minutes, a temperature is raised to 300° C. at a rate of 10° C./minute and held at 300° C. for 5 minutes;
a sample is injected in split mode at a split ratio of 20:1; and
a measurement time is 50 minutes from a sample injection.

2. The solid electrolyte composition according to claim 1, wherein the plurality of alkane dispersion media include a cyclic alkane dispersion medium.

3. The solid electrolyte composition according to claim 1, comprising:
at least one of an ether dispersion medium, an ester dispersion medium, a ketone dispersion medium, a carbonate dispersion medium, a nitrile dispersion medium, or an amide dispersion medium.

4. The solid electrolyte composition according to claim 1, further comprising:
an active material.

5. A solid electrolyte-containing sheet comprising:
a layer formed of the solid electrolyte composition according to claim 1,
wherein the layer contains the alkane dispersion medium in an amount of 1,000 ppm or less by mass.

6. A method for manufacturing the solid electrolyte-containing sheet according to claim 5, the method comprising:
a step of applying a solid electrolyte composition onto a base material, the composition comprising:
a sulfide-based inorganic solid electrolyte; and
a plurality of kinds of alkane dispersion media having, with respect to a peak of each alkane dispersion medium obtained by a measurement under the following conditions using a gas chromatography, a number of combinations of the alkane dispersion media in which a difference in a retention time between mutually adjacent peaks is within 0.2 minutes is 6 or more, wherein the retention times of all peaks are 4 to 17 minutes, and a proportion of the alkane dispersion medium having the largest content in the plurality of alkane dispersion media is 70% by mass or less,
<conditions for gas chromatography>
column: Agilent J&W GC COLUMN manufactured by Agilent Technologies Inc., 30 m, 0.25 mmφ, 40° C.;
injection amount: 1 μL of a solution obtained by dissolving 25 mg of a plurality of kinds of alkane dispersion media in 25 ml of ethyl acetate;
mobile phase: He;
temperature rising: after held at 40° C. for 2 minutes, a temperature is raised to 300° C. at a rate of 10° C./minute and held at 300° C. for 5 minutes;

a sample is injected in split mode at a split ratio of 20:1; and a measurement time is 50 minutes from a sample injection.

7. An all-solid state secondary battery comprising:
a positive electrode active material layer;
a negative electrode active material layer; and
a solid electrolyte layer,
wherein at least one layer of the positive electrode active material layer, the negative electrode active material layer, or the solid electrolyte layer is a layer formed of the solid electrolyte composition according to claim 1.

* * * * *